(12) United States Patent
Kopp et al.

(10) Patent No.: US 6,744,943 B2
(45) Date of Patent: Jun. 1, 2004

(54) ADD-DROP FILTER UTILIZING CHIRAL ELEMENTS

(75) Inventors: Victor Il'ich Kopp, Flushing, NY (US); Azriel Zelig Genack, New York, NY (US)

(73) Assignee: Chiral Photonics, Inc., Clifton, NJ (US)

( * ) Notice: Subject to any disclaimer, the term of this patent is extended or adjusted under 35 U.S.C. 154(b) by 0 days.

(21) Appl. No.: 10/017,963

(22) Filed: Dec. 12, 2001

(65) Prior Publication Data

US 2002/0071632 A1 Jun. 13, 2002

Related U.S. Application Data

(60) Provisional application No. 60/254,815, filed on Dec. 12, 2000.

(51) Int. Cl.[7] .......................... G02B 6/28; G02B 27/10; H04J 14/00
(52) U.S. Cl. ........................ 385/24; 359/629; 398/65; 398/84; 398/85
(58) Field of Search ................ 398/65, 83–85; 359/618, 629, 115, 122, 124, 127, 130; 385/24, 37

(56) References Cited

U.S. PATENT DOCUMENTS

| | | | | |
|---|---|---|---|---|
| 5,754,321 A | * | 5/1998 | Giles et al. | 359/124 |
| 5,940,556 A | * | 8/1999 | Moslehi et al. | 385/28 |
| 5,978,131 A | * | 11/1999 | Lauzon et al. | 359/341 |
| 6,360,037 B1 | * | 3/2002 | Riza | 385/22 |
| 6,535,324 B1 | * | 3/2003 | Hwang et al. | 359/283 |

* cited by examiner

*Primary Examiner*—Gerard Strecker
(74) *Attorney, Agent, or Firm*—Edward Etkin, Esq.

(57) ABSTRACT

An add-drop filter, utilizing chiral elements, that enables a new signal to be added at a particular vacuum wavelength $\lambda'_k$ to a fiber optic line carrying n signal channels over a band of wavelengths encompassing $\lambda_1 \ldots \lambda_{k-1}, \lambda_k, \lambda_{k+1} \ldots \lambda_n$, while an existing signal, $\lambda_k$, is simultaneously dropped from the signal group.

10 Claims, 1 Drawing Sheet

ADD-DROP FILTER UTILIZING CHIRAL ELEMENTS

CROSS REFERENCE TO RELATED APPLICATIONS

The present patent application claims priority from the commonly assigned U.S. provisional patent application Ser. No. 60/254,815 entitled "Add-Drop Filter Utilizing Resonant Optical Activity" filed Dec. 12, 2000.

FIELD OF THE INVENTION

The present invention relates generally to optical filters utilizing fiber Bragg grating type structures, and mere particularly to an add-drop filter utilizing chiral elements capable of changing polarization angles of selected polarized signal components.

BACKGROUND OF THE INVENTION

Add-drop filters have many industrial applications—for example in information processing, in telecommunication systems, and especially in optical fiber communication systems utilizing wavelength division multiplexing (WDM). An add-drop filter enables a new signal to be added at a particular wavelength $\lambda'_k$ to a fiber optic line carrying n signal channels over a band of wavelengths encompassing $\lambda_1 \ldots \lambda_{k-1}, \lambda_k, \lambda_{k+1}, \ldots \lambda_n$, while an existing signal, $\lambda_k$ is simultaneously dropped from the signal group. This functionality is essential in telecommunication systems. Previously known add-drop filters are relatively complex devices that require several expensive components, such as polarization converters that not only increase the filter's cost but also add to its complexity.

Presently used add-drop filters are mostly based on fiber Bragg Gratings (FBGs). FBGs are typically manufactured through irradiating an optical fiber made from a UV-sensitive material with UV light using a pre-designed phase mask. Another prior-art approach to manufacturing fiber Bragg gratings involves irradiating a UV-sensitive optical fiber with two interfering UV laser beams. However, the previously known FBGs are relatively expensive and difficult to manufacture. Some of the efficient modern add-drop filters provide better performance than older non-FBG filters, but because they utilize both FBGs and polarization converters, they are relatively expensive and complex and therefore difficult to fabricate.

It would thus be desirable to provide an add-drop filter utilizing a novel construction and inventive chiral elements that advantageously eliminates and replaces components required in previously known add-drop-filers while providing better performance and higher efficiency.

SUMMARY OF THE INVENTION

Figure 1:
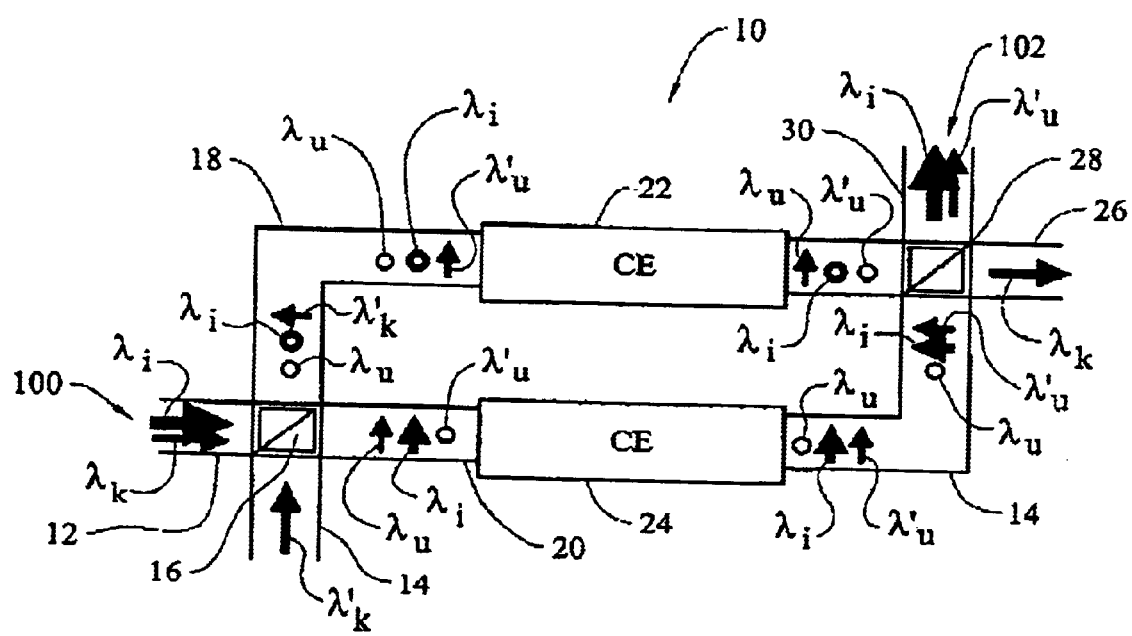
FIG. 1 is a schematic diagram of a preferred embodiment of an add-drop filter of the present invention.

The present invention is directed to an add-drop filter that utilizes resonant optical activity that enables a new signal to be added at a particular vacuum wavelength $\lambda'_k$ to a fiber optic line carrying n signal channels over a band of vacuum wavelengths encompassing $\lambda_1 \ldots \lambda_{k-1}, \lambda_k, \lambda_{k+1} \ldots \lambda_n$ while an existing signal, $\lambda_k$ is simultaneously dropped from the signal group.

The inventive add-drop optical filter subtracts a drop signal from a target wavelength channel of a multi-channel input signal and adds an add signal into the target wavelength channel. The inventive add-drop optical filter includes an input port for receiving the multi-channel input signal, the input signal comprising a plurality of input signals in a plurality of corresponding channels, and the drop signal in the target wavelength channel, an add port for delivering the add signal at the target wavelength to the input signal; a first polarization splitter, connected to the input port and to the add port, for splitting each of the input, drop, and add signals into two corresponding input, drop, and add signal polarized components; a first chiral element for changing polarization of the add and drop signals at the target wavelength and for passing all signals at other wavelengths therethrough; a first line for delivering a first portion of the input, drop, and add signal polarized components to the first chiral element, such that the input signal polarized components pass through the first chiral element, wherein polarization of the add and drop signal polarized components is changed; a second chiral element for changing polarization of the add and drop signals at the target wavelength and for passing all signals at other wavelengths therethrough; a second line for delivering a second portion of the input, drop, and add signal polarized components to the second chiral element, such that the input signal polarized components pass through the second chiral element, wherein polarization of the add and drop signal polarized components is changed; an output port for transmitting, to a first external destination, an output signal comprising a plurality of input signals in a plurality of corresponding channels and the add signal in the target wavelength channel; a drop port for transmitting the drop signal in the target wavelength channel to a second external destination; and a second polarization splitter, connected to the first and second lines and to the output and drop ports, for directing the input and add signal polarized components to the output port and for directing the drop signal polarized components to the drop port.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENT

The essence of the inventive add-drop filter involves utilization of novel chiral elements in the filter to provide 90% polarization rotation for signal components at a selected wavelength. Chiral elements, such as chiral optical fibers or cholesteric liquid crystal (CLC) structures, are either known in the art (e.g. CLCs) or are novel and described in greater detail in co-pending commonly assigned patent applications (e.g. chiral fibers) referred to below.

Preferably, the pitch of a chiral element utilized in the inventive add-drop filter is approximately equal to the particular add/drop signal wavelength $\lambda_k$ divided by the effective refractive index of the chiral element at that wavelength (i.e. the pitch should generally be equal to the wavelength inside the element). The speed of signal propagation in the chiral element is different for right and left circularly polarized light only at the particular wavelength k. Preferably, the length of each chiral element is chosen to have 90° polarization rotation at the wavelength $\lambda_k$. As a result, certain polarized components are passed through the chiral elements unchanged while $\lambda_k$ and $\lambda'_k$ have their polarization changed by 90° as they pass through.

Any chiral element having the above-described properties may be utilized in the inventive add-drop filter. The chiral elements may be produced and/or configured using one or more of the following exemplary techniques as a matter of design choice without departing from the spirit of the invention:

1) A chiral element may be produced by twisting one or more heated optical fibers as disclosed in the co-pending commonly assigned U.S. patent applications entitled: "APPARATUS AND METHOD FOR MANUFACTURING PERIODIC GRATING OPTICAL FIBERS" Ser. No.; 09/925,590; "CHIRAL FIBER GRATING" Ser. No.; 10/097,024, and "APPARATUS AND METHOD FOR FABRICATING CHIRAL FIBER GRATINGS" Ser. No.; 10/099,623; which are all hereby incorporated by reference in their entirety;

2) A chiral element may be produced by twisting the cladding of an optical fiber about its straight unmodified core;

3) A chiral element may be produced by imposing modulation of the effective refractive index in an optical fiber by writing a single or a double helix pattern on the external surface of the fiber. For example, a periodic structure, such as a groove may be formed on its surface. This may be accomplished via laser ablation or by the addition of dielectric material in a helix on the outside of the fiber. The helical dielectric about the fiber can also be deposited and subsequently developed. These techniques are disclosed in the above-incorporated U.S. patent applications "HELICAL FIBER BRAGG GRATING", and "APPARATUS AND METHOD FOR FABRICATING HELICAL FIBER BRAGG GRATINGS";

4) Another way of producing a chiral element involves imposing a helical or a double helical modulation of the refractive index at the core of an optical fiber as disclosed in the co-pending commonly assigned U.S. patent application entitled: "APPARATUS AND METHOD OF MANUFACTURING CHIRAL FIBER BRAGG GRATINGS" Ser. No. 10/020,678; and 5) The chiral element may be composed of a substance having an inherent chiral structure. For example, the chiral element may be one or more cholesteric liquid crystal layers.

It should be noted that chiral structures typically include a reflection stop band—a range of wavelengths at which light traveling through the chiral structure is reflected. Preferably, the reflection in chiral structures utilized in the add-drop filter of the present invention is minimized to allow maximum possible transmission.

Referring now to FIG. 1, an inventive add-drop filter 10 is shown. An input signal 100 containing n channels (including the channel to be dropped at the wavelength $\lambda_k$) enters into the add-drop filter 10 through an input port 12 and is divided into two parts with different polarization—one perpendicular to the plane of incidence (hereinafter "PPI" denoted by a circle in FIG. 1) and one in the plane of incidence hereinafter "IPI" denoted by an arrow in FIG. 1) by a first polarization splitter 16 that splits unpolarized light into two polarized components. The first polarization splitter 16 also passes IPI polarized signals and deflects PPI polarized signals in a manner shown in FIG. 1. The polarization splitter 16 may be any device well known in the art that is capable of splitting unpolarized light into two polarized components.

The differently polarized signal components then proceed along optical fibers 18, 20 to respective chiral elements 22 and 24. A signal $\lambda'_k$ to be added at the wavelength $\lambda_k$ enters the add-drop filter 10 through an add port 14 and is also divided into IPI and PPI polarized components by the first polarization splitter 16, where the two $\lambda'_k$ components also proceed along the fibers 18, 20 to respective chiral elements 22 and 24.

The speed of propagation in each of the chiral elements 22, 24 is different for right and left circularly polarized light only at the particular wavelength $\lambda_k$. Preferably, the length of each chiral element 22, 24 is chosen to induce 900 polarization rotation at the wavelength $\lambda_k$. As a result, $\lambda_i$ polarized components are passed through the chiral elements 22, 24 to an output port 30 without change in their polarization, while $\lambda_k$ and $\lambda'_k$ have their IPI and PPI polarization components changed by 90° as they pass through. After having its IPI polarized component pass through a second polarization splitter 28 (of similar design to the first polarization splitter 16), and its PPI component arriving via the fiber 18 to be deflected by the second polarization splitter 28, the $\lambda'_k$ signal is directed to the output port 30 to form the full output signal 102. At the same time, the PPI component of the $\lambda_k$ signal arrives via the fiber 20 and is deflected by the second polarization splitter 28 into a drop port 26; while the IPI component of the $\lambda_k$ signal arrives via the fiber 18 and is passed by the second polarization splitter 28 into the drop port 26 such that the entire $\lambda_k$ signal (consisting of the IPI and PPI components) is dropped into the drop port 26. Thus, the inventive add-drop filter 10 advantageously substitutes the $\lambda'_k$ signal for the $\lambda_k$ signal. The use of the novel chiral elements 20, 22 simplifies the construction of the inventive add-drop filter 10, improves its efficiency and reduces its manufacturing cost.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. Au add-drop optical filter for removing a drop signal from a target wavelength channel of a multi-channel input signal and adding an add signal into the target wavelength channel, comprising:

input means for receiving the multi-channel input signal, the input signal comprising a plurality of input signals in a plurality of corresponding channels and the drop signal in the target wavelength channel;

adding means for delivering the add signal at said target wavelength to the input signal;

first polarization splitter means, connected to said input port and to said adding means, for splitting each of the input, drop, and add signals into two corresponding input, drop, and add signal polarized components;

first polarization changing means for changing polarization of the add and drop signals at said target wavelength and passing all signals at other wavelengths therethrough;

a first line for delivering a first portion of said input, drop, and add signal polarized components to said first polarization changing means, such that said input signal polarized components pass through said first polarization changing means, wherein polarizations of said add and drop signal polarized components is changed;

second polarization changing means for changing polarization of the add and drop signals at said target wavelength and passing all signals at other wavelengths therethrough;

a second line for delivering a second portion of said input, drop, and add signal polarized components to said second polarization changing means, such that said input signal polarized components pass through said second polarization changing means, wherein polarization of said add and drop signal polarized components is changed;

output means for transmitting, to a first external destination, an output signal comprising a plurality of Input signals in a plurality of corresponding channels and the add signal in the target wavelength charnel;

drop means for transmitting the drop signal in the target wavelength channel to a second external destination; and second polarization splitter means, connected to said first and second polarization changing means and to said output and drop means, for directing the input and add signal polarized components to said output means and for directing said drop signal polarized components to said drop means.

2. The add-drop filter of claim 1, wherein said first and said second polarization changing means comprise respective first and second chiral elements.

3. The add-drop filter of claim 2, wherein a pitch of said first and said second chiral elements is substantially equal to the wavelength of the target wavelength channel.

4. The add-drop filter of claim 2, wherein said first and said second chiral elements change said polarization of said add and drop signals at said target wavelength by 90°.

5. The add-drop filter of claim 2, wherein each of said first and said second chiral elements are selected from: a chiral fiber having single helix symmetry, a chiral fiber having double helix symmetry, and a cholesteric liquid crystal structure.

6. An add-drop optical filter for removing a drop signal from a target wavelength channel of a multi-channel input signal and adding an add signal into the target wavelength channel, comprising:

an input port operable to receive the multi-channel input signal, the input signal comprising a plurality of input signals in a plurality of corresponding channels, and the drop signal in the target wavelength channel;

an add port operable deliver the add signal at said target wavelength to the input signal;

a first polarization splitter, connected to said input port and to said add port, operable to split each of the input, drop, and add signals into two corresponding input, drop, and add signal polarized components;

a first chiral element operable to change polarization of the add and drop signals at said target wavelength and to pass all signals at other wavelengths therethrough;

a fit line that delivers a first portion of said input, drop, and add signal polarized components to said first chiral element, such that said input signal polarized components pass through said first chiral element, wherein polarization of said add and drop signal polarized components is changed;

a second chiral element operable to change polarization of the add and drop signals at said target wavelength and to pans all signals at other wavelengths therethrough;

a second line that delivers a second portion of said input, drop, and add signal polarized components to said second chiral element, such that said input signal polarized components pass through said second chiral element, wherein polarizations of said add and drop signal polarized components is changed;

an output port operable to transmit, to a first external destination, an output signal comprising a plurality of input signals in a plurality of corresponding channels and the add signal in the target wavelength channel;

a drop port operable to transmit the drop signal in the target wavelength channel to a second external destination; and a second polarization splitter, connected to said first and second lines polarization changing means and to said output and drop parts, operable to direct the input and add signal polarized components to said output port and to direct said drop signal polarized components to said drop port.

7. The add-drop filter of claim 6, wherein a pitch of said first and said second chiral elements is substantially equal to the wavelength of the target wavelength channel.

8. The add-drop filter of claim 6, wherein said first and said second chiral elements change said polarization of said add and drop signals at said target wavelength by 90°.

9. The add-drop filter of claim 6, wherein each of said first and said second chiral elements are selected from: a chiral fiber having single helix symmetry, a chiral fiber having double helix symmetry, and a cholesteric liquid crystal structures.

10. A method for removing a drop signal from a target wavelength channel of a multi-channel input signal and adding an add signal into the target wavelength channel, comprising the steps of:

(a) receiving the multi-channel input signal, the input signal comprising a plurality of input signals in a plurality of corresponding channels, and the drop signal in the target wavelength channel;

(b) delivering the add signal at said target wavelength to the input signal;

(c) splitting each of the input, drop, mud add signals into two corresponding input, drop, and add signal polarized components;

(d) changing polarizations of cinch of said two add and drop signal components at maid target wavelength and keeping polarizations of all signals at other wavelengths unchanged;

(e) combining said changed add signal polarized components with said input signal polarized components into an output signal comprising a plurality of input signals in a plurality of corresponding channels and the add signal in the target wavelength channel;

(f) transmitting said output signal to a first external destination; and (g) combining said changed drop signal polarized components into the drop signal; and (h) transmitting the drop signal in the target wavelength charnel to a second external destination.

* * * * *